United States Patent
Zhang et al.

(10) Patent No.: US 12,175,792 B2
(45) Date of Patent: Dec. 24, 2024

(54) METHOD AND APPARATUS FOR GENERATING OBJECT MODEL, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Shichang Zhang, Beijing (CN); Ziyuan Guo, Beijing (CN); Yafei Zhao, Beijing (CN); Chao Chen, Beijing (CN); Xirui Fan, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 372 days.

(21) Appl. No.: 17/820,108

(22) Filed: Aug. 16, 2022

(65) Prior Publication Data
US 2022/0392251 A1    Dec. 8, 2022

(30) Foreign Application Priority Data
Aug. 17, 2021    (CN) .......................... 202110945260.6

(51) Int. Cl.
*G06V 40/16*    (2022.01)
*G06T 1/00*    (2006.01)

(52) U.S. Cl.
CPC ............ *G06V 40/16* (2022.01); *G06T 1/0007* (2013.01); *G06T 2210/44* (2013.01)

(58) Field of Classification Search
CPC ... G06V 40/16; G06T 1/0007; G06T 2210/44; G06T 7/579; G06T 2207/10016;
(Continued)

(56) References Cited

U.S. PATENT DOCUMENTS 11,037,320 B1 *  6/2021  Ebrahimi Afrouzi ..... G06T 7/90
11,043,026 B1 *  6/2021  Fathi ...................... G06N 20/00
(Continued)

FOREIGN PATENT DOCUMENTS

CN    110827302 A  *  2/2020
CN    111028330 A     4/2020
(Continued)

OTHER PUBLICATIONS

Office Action issued for European patent application 22190483.2, mailed Nov. 8, 2023 (8 pages).
(Continued)

*Primary Examiner* — Mahendra R Patel
(74) *Attorney, Agent, or Firm* — Osha Bergman Watanabe & Burton LLP (57) ABSTRACT

A method for generating an object model includes: obtaining an initial morphable model; obtaining a plurality of initial images of an object, and depth images corresponding to the plurality of initial images; obtaining a plurality of target topological images by processing the plurality of initial images based on the depth images; obtaining a plurality of models to be synthesized by processing the initial morphable model based on the plurality of target topological images; and generating a target object model based on the plurality of models to be synthesized.

17 Claims, 7 Drawing Sheets

(58) Field of Classification Search
CPC . G06T 2207/10021; G06T 2207/10024; G06T 2207/10028; G06T 2207/20036; G06T 2207/20084; G06T 2207/30196; G06T 2207/30201; G06T 17/20; G06T 2219/2021; G06T 19/20; G06T 17/205; G06T 7/593; G06T 2219/2004
USPC .......................................................... 382/118
See application file for complete search history.

(56) References Cited

U.S. PATENT DOCUMENTS

| | | | | |
|---|---|---|---|---|
| 11,592,820 | B2* | 2/2023 | Owechko | G01S 13/865 |
| 11,651,581 | B2* | 5/2023 | Devitt | G06V 10/7715 |
| | | | | 382/190 |
| 11,676,343 | B1* | 6/2023 | Marotta | G06N 3/08 |
| | | | | 345/419 |
| 11,830,210 | B2* | 11/2023 | Lasserre | G06T 15/205 |
| 11,927,457 | B2* | 3/2024 | Van Der Merwe | G05D 1/0274 |
| 12,055,939 | B2* | 8/2024 | Carrigg | G01C 21/3811 |
| 2018/0253909 | A1* | 9/2018 | Chen | G06T 7/344 |
| 2019/0156507 | A1* | 5/2019 | Zeng | G06F 16/29 |
| 2020/0320727 | A1* | 10/2020 | Smolic | G06T 15/08 |
| 2020/0357158 | A1* | 11/2020 | Zhang | G06F 3/147 |

FOREIGN PATENT DOCUMENTS

| | | | | |
|---|---|---|---|---|
| CN | 111210518 | A * | 5/2020 | ........... G06K 9/6278 |
| CN | 111710023 | A * | 9/2020 | ........... G06T 15/005 |
| CN | 111768488 | A | 10/2020 | |
| CN | 111932671 | A * | 11/2020 | ............. G06T 17/00 |
| CN | 112002014 | A | 11/2020 | |
| CN | 112634343 | A | 4/2021 | |
| CN | 113450269 | A * | 9/2021 | |
| CN | 113744416 | A * | 12/2021 | ............. G06T 19/20 |
| CN | 113781653 | A * | 12/2021 | ........... G06T 1/0007 |
| CN | 111210518 | B * | 4/2022 | ........... G06K 9/6278 |
| EP | 2674913 | A1 * | 12/2013 | ......... G06K 9/00342 |
| EP | 4030385 | A1 * | 7/2022 | ............. A61B 34/10 |
| GB | 2602255 | A * | 6/2022 | ............. G06T 13/40 |

OTHER PUBLICATIONS

Zollhofer, et al.; "State of the Art on 3D Reconstruction with RGB-D Cameras," STAR—State of The Art Report; vol. 37, No. 2, 2018 (28 pages).
European Search Report issued in European Application No. 22190483.2, mailed on Jan. 27, 2023 (9 pages).
Yao et al.; "Accurate nonrigid 3D human body surface reconstruction using commodity depth sensors;" Computer Animation and Virtual Worlds; vol. 29; No. 5; Sep. 1, 2018; pp. 1-39 (39 pages).
Oguzhan et al.; "Human body reconstruction from limited number of points;" Computer Animation and Virtual Worlds; vol. 32; No. 5; Apr. 8, 2021; pp. 1-20 (20 pages).
Huber et al.; "Real-time 3D morphable shape model fitting to monocular in-the-wild videos;" University of Surrey; Jun. 2017; pp. 1-125 (125 pages).
Varun et al.; "The informed sampler: A discriminative approach to Bayesian inference in generative computer vision models;" Computer Vision and Image Understanding, Academic Press, US; vol. 136; May 24, 2015; pp. 32-44 (13 pages).
Office Action issued for corresponding Chinese patent application No. 202110945260.6, mailed May 7, 2022 (17 pages).
Notice of Allowance issued for corresponding Chinese patent application No. 202110945260.6, mailed on Jul. 27, 2022 (10 pages).

* cited by examiner

METHOD AND APPARATUS FOR GENERATING OBJECT MODEL, ELECTRONIC DEVICE AND STORAGE MEDIUM

CROSS REFERENCE TO RELATED APPLICATIONS

This application claims priority and benefits to Chinese Application No. 202110945260.6, filed on Aug. 17, 2021, the entire content of which is incorporated herein by reference.

TECHNICAL FIELD

The disclosure relates to a field of computer technologies, especially fields of artificial intelligence (AI) technologies such as deep learning and computer vision, and in particular to a method for generating an object model, an apparatus for generating an object model, an electronic device and a storage medium.

BACKGROUND

Artificial intelligence (AI) is a study of making computers to simulate certain thinking processes and intelligent behaviors of humans (such as learning, reasoning, thinking and planning), which has both hardware-level technologies and software-level technologies. AI hardware technologies generally include technologies such as sensors, dedicated AI chips, cloud computing, distributed storage, and big data processing. AI software technologies mainly include computer vision technology, speech recognition technology, natural language processing technology, machine learning, deep learning, big data processing technology, knowledge graph technology and other major directions. There is a need to generate an object model.

SUMMARY

According to a first aspect of the disclosure, a method for generating an object model is provided. The method includes: obtaining an initial morphable model; obtaining a plurality of initial images of an object, and depth images respectively corresponding to the plurality of initial images; obtaining a plurality of target topological images by processing the plurality of initial images based on the depth images; obtaining a plurality of models to be synthesized by respectively processing the initial morphable model based on the plurality of target topological images; and generating a target object model based on the plurality of models to be synthesized.

According to a second aspect of the disclosure, an electronic device is provided. The electronic device includes: at least one processor and a memory communicatively coupled to the at least one processor. The memory stores instructions executable by the at least one processor. When the instructions are executed by the at least one processor, the method for generating an object model according to embodiments of the first aspect of the disclosure is implemented.

According to a third aspect of the disclosure, a non-transitory computer-readable storage medium having computer instructions stored thereon is provided. The computer instructions are configured to cause a computer to implement the method for generating an object model according to embodiments of the first aspect of the disclosure.

It is understandable that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

In related arts, an object model generating method generally depends on expensive image capturing devices, high-configured computer hardware, and complex calculation processes, which makes it difficult for the method to be universal. Therefore, embodiments of the disclosure provide a method for generating an object model.

Figure 1:
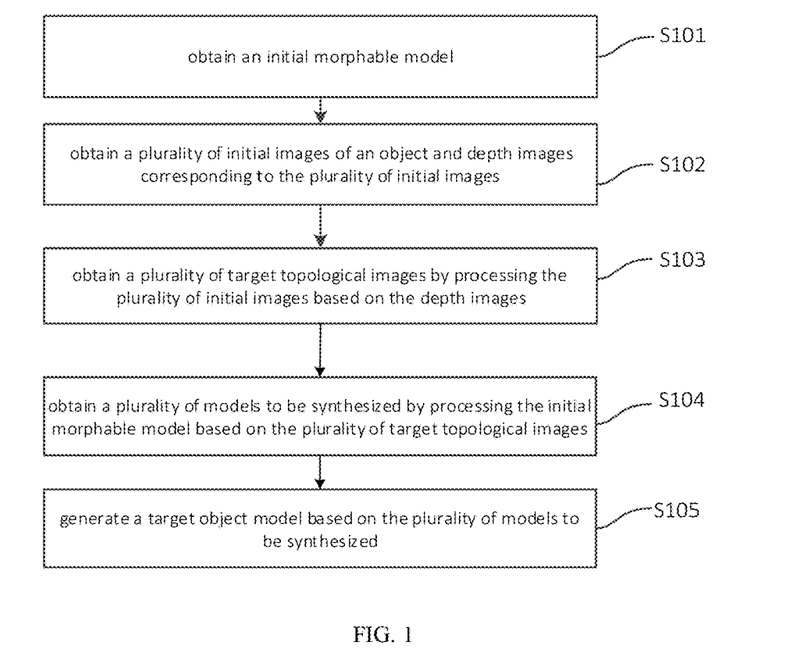
FIG. 1 is a schematic diagram of a first embodiment of the disclosure.

FIG. 1 is a schematic diagram of a first embodiment of the disclosure.

It is to be noted that the executive subject of the method for generating an object model of the embodiment is an apparatus for generating an object model. The apparatus can be implemented by software and/or hardware, and can be included in an electronic device. The electronic device includes but not limited to terminals and servers.

The embodiments of the disclosure relate to fields of AI technologies such as deep learning and computer vision.

Artificial intelligence is abbreviated as AI, which is a new technical science that studies and develops theories, methods, techniques and application systems for simulating, extending and expanding human intelligence.

Deep learning is to learn the inherent laws and representation levels of sample data, and the information obtained during these learning processes is of great help to the interpretation of data such as text, images and sounds. The ultimate goal of deep learning is to enable machines to have the ability to analyze and learn like humans, and to recognize data such as words, images and sounds.

Computer vision refers to the use of cameras and computers instead of human eyes to perform machine vision, such as identifying, tracking and measuring targets, and to further perform graphics processing, to make images processed by the computers more suitable for human eyes to observe or for being transmitted to instruments for detection.

As illustrated in FIG. 1, the method for generating an object model includes the following.

In S101, an initial morphable model is obtained.

The morphable model can intuitively describe the morphology of an object (for example, texture, structure and shape). The object can be, for example, a human, an animal or a building, which is not limited.

The above morphable model may be a two-dimensional (2D) model, or a three-dimensional (3D) model, which is not limited.

For example, a specific application scenario of embodiments of the disclosure may be, for example, adopting a method for generating an object morphable model to generate a 3D human model that can be used to represent a realistic person image. The following description of the embodiments of the disclosure will take the above application scenario as an example. In addition, the embodiments of the disclosure can also be applied to any other possible application scenarios of generating an object morphable model, which are not limited.

In an initial stage of the method for generating an object morphable model, an obtained unprocessed morphable model is called the initial morphable model. The initial morphable model can be, for example, an initial 3D head model or a 3D face parameterized model, which is not limited.

In embodiment of the disclosure, the acquisition processing of the human model, the head model, the face model and the human body model is in compliance with relevant laws and regulations, and does not violate public order and good customs.

For example, in some embodiments, in obtaining the initial morphable model, any 3D head model or any 3D face parameterized model may be retrieved from a model library as the initial morphable model. Alternatively, a 3D head model or a 3D face parameterized model can be built through the 3D model building technology, and used as the initial morphable model, which is not limited.

In S102, a plurality of initial images of an object are obtained, and depth images corresponding to the plurality of initial images are obtained.

In the above-mentioned application scenario of generating the 3D human model, the object can be, for example, a head or a human body of a person. Correspondingly, the plurality of initial images of the object and the depth images corresponding to the initial images are obtained. In detail, for example, a plurality of initial images of a head of a person and depth images corresponding to the initial images are obtained.

The above initial images and the depth images corresponding to the initial images are obtained under the condition of complying with relevant laws and regulations. For example, the initial images and the depth images can be obtained from a public image set, or a relevant user after being authorized by the relevant user.

The initial images may be at least two different initial images, which is not limited.

The initial images can be obtained by photographing the object at different times from the same angle, or can be obtained by photographing the object from different angles at the same time. Each of the initial image can be a red-green-blue (RGB) image, which is not limited.

The depth image can also be called distance image, refers to an image of which the pixel values are respective distances from an image capturing device to corresponding points of the object. That is, each pixel value of the depth image is a respective distance between the image capturing device and a corresponding point of the object.

In some embodiments, obtaining the initial images of the object and the depth images corresponding to the initial images may include obtaining the initial images of the object through an image capturing device, and obtaining the depth images corresponding to the initial images by performing image process on the initial images. Alternatively, obtaining the initial images of the object and the depth images corresponding to the initial images may include photographing the object through a camera component including a plane camera and a depth camera (for example, the depth image is a binocular stereo camera, a Time of Flight (TOF) camera, or the like). The method of obtaining the original images and the depth images is not limited in the disclosure.

In S103, a plurality of target topological images are obtained by respectively processing the plurality of initial images based on the depth images.

For example, the target topological images can be obtained by performing a topology algorithm on the initial images based on the depth images. The topology algorithm refers to characterizing an entity by points and lines irrelevant to the entity's size or shape and then graphically expressing the relationship between these points and lines. Correspondingly, an image used to graphically represent the relationship between the points and lines can be called a topological image.

Therefore, after obtaining the initial images and the depth images corresponding respectively to the initial image, the initial images can be processed based on the depth images to obtain processed initial images. The processed initial images are the target topological images.

In some embodiments, obtaining the target topological images by processing the initial images based on the depth images can further include processing the initial images based on the depth images through a model analysis method or an image transformation method to obtain the target topological images, which is not limited in the disclosure.

In S104, a plurality of models to be synthesized are obtained by processing the initial morphable model based on the plurality of target topological images.

After obtaining the initial images and the corresponding depth images, the initial images can be processed based on the depth images, to obtain processed initial images as the target topological images.

In some embodiments, obtaining the target topological images by processing the initial images based on the depth images can include performing a topology algorithm on the initial images based on the depth images to obtain the target topological images, or processing the initial images based on the depth images through a model analysis method or an image transformation method to obtain the target topological images, which is not limited in the disclosure.

In S105, a target object model is generated by the plurality of models to be synthesized.

After the models to be synthesized are obtained by processing the initial morphable model based on the target topological images, the models to be synthesized can be used to generate the target object model. The target object model can be specifically, for example, a 3D human model, which is not limited in the disclosure.

In some embodiments, a splicing process can be performed on the models to be synthesized to obtain a spliced model as the 3D human model.

For example, the models to be synthesized can be a 3D head model and a 3D human body model. The 3D head model and the 3D human body model can be spliced to obtain a 3D human model which is the target object model.

Alternatively, any other possible manner may be used to generate the target object model based on the models to be synthesized, which is not limited in the disclosure.

In embodiments of the disclosure, initial morphable model, the initial images of the object, and the depth images corresponding to the initial images are obtained, the target topological images are obtained by processing the initial images based on the depth images, the models to be synthesized are obtained by processing the initial morphable model based on the target topological images, and the target object model is generated based on the plurality of models to be synthesized. In this way, the costs of generating the object model can be greatly reduced, the generation effect of the object model can be effectively improved, and thus the applicability of the method for generating an object model can be significantly improved.

Figure 2:
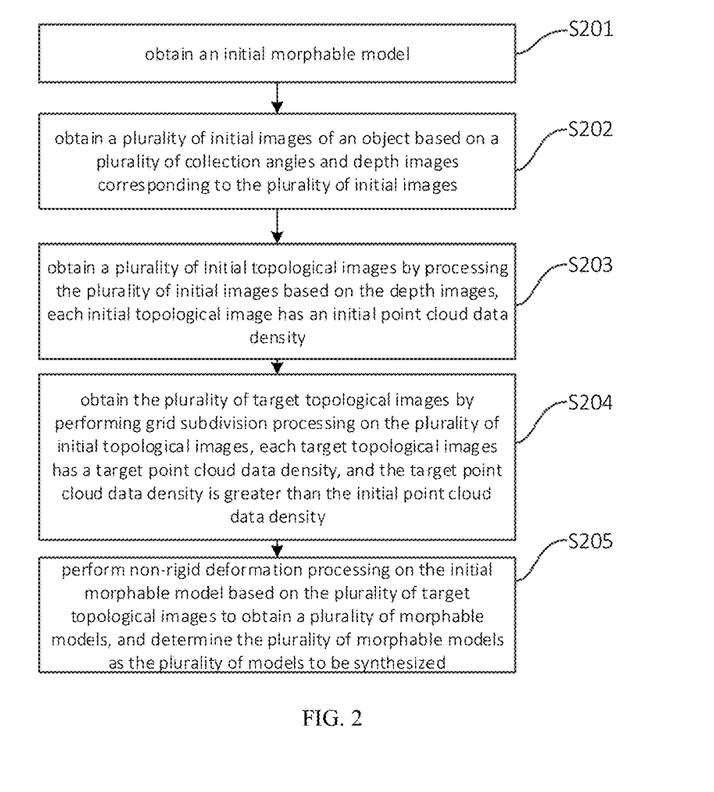
FIG. 2 is a schematic diagram of a second embodiment of the disclosure.

FIG. 2 is a schematic diagram of a second embodiment of the disclosure.

As illustrated in FIG. 2, the method for generating an object model includes the following.

In S201, an initial morphable model is obtained.

In S202, a plurality of initial images of an object are captured from different photographing angles, and depth images corresponding to the plurality of initial images are obtained.

The photographing angle refers to an angle of photographing the object to obtain a corresponding initial image. When the object is a human head, the photographing angles can be, for example, directly in front of the human head, the left side of the head, the right side of the head, etc., which is not limited in the disclosure.

That is, the initial images and the corresponding depth images can be obtained by photographing the object from different photographing angles. Since the initial images and the depth images are acquired from different photographing angles, the convenience of image acquisition can be effectively improved while effectively reducing the costs of image acquisition. In addition, the initial images captured from different photographing angles can fully represent the morphology of the object (e.g., the texture, the structure and the shape of the object), such that the accuracy of the generated object model can be improved.

Figure 3:
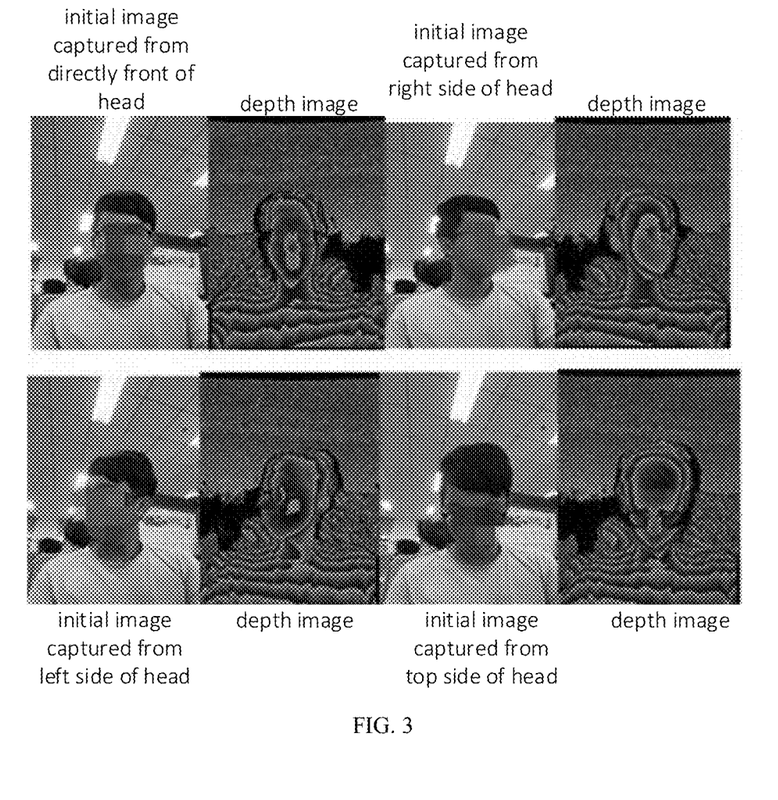
FIG. 3 is a schematic diagram of image acquisition according to an embodiment of the disclosure.

For example, this block will be described in detail in combination with FIG. 3. FIG. 3 is a schematic diagram of image acquisition according to an embodiment of the disclosure. As illustrated in FIG. 3, four initial images of a human head are acquired from four different photographing angles, and four depth images corresponding to the four initial images are obtained.

It is to be noted that the image shown in FIG. 3 is obtained under the authorization of the relevant user, and the obtaining process complies with the provisions of relevant laws and regulations, and does not violate public order and good customs.

In S203, a plurality of initial topological images are obtained by processing the plurality of initial images based on the depth images. Each initial topological image has a respective initial point cloud data density.

For example, after obtaining the initial images and the depth images corresponding to the initial images, the coordinate transformation can be performed on the depth images to obtain point cloud data. The initial images can be processed based on the point cloud data to obtain the initial topological images.

Each initial topological image has a corresponding point cloud data density which is also called the initial point cloud data density.

In some embodiments, obtaining the initial topological images by processing the initial images based on the depth images may include: performing differentiable rendering on the initial images based on the depth images to processed initial images as the initial topological images. Therefore, the loss of image data in the image processing process can be effectively reduced, the accuracy of the initial topological image can be effectively improved, and the execution of subsequent process of the method for generating an object model can be effectively assisted.

Performing the differentiable rendering on the initial images based on the depth images can be done through a pre-trained differentiable rendering model. For example, the depth images and the corresponding initial images can be jointly used as input parameters of the pre-trained differentiable rendering model, and the differentiable rendering model can output the initial topological images, which is not limited in the disclosure.

In S204, the plurality of target topological images are obtained by performing the grid subdivision processing on the plurality of initial topological images. Each target topological image has a respective target point cloud data density, and the target point cloud data density is greater than the initial point cloud data density.

That is, the target topological image can have a corresponding point cloud data density, which is called the target point cloud data density. The target point cloud data density is greater than the initial point cloud data density.

After obtaining the initial topological images by processing the initial images based on the depth images, the grid subdivision processing is performed on the initial topological images respectively to obtain the target topological images. In this way, in the subsequent process of generating the object model, the image alignment effect can be effectively guaranteed, and the accuracy and reliability of the object model generation results can be greatly improved.

That is, after obtaining the plurality of initial topological images by processing the plurality of initial images based on the depth images, performing the grid subdivision processing on each initial topological image can increase the density of the point cloud data of the initial topological image, such that the target topological image having a higher density of the point cloud data is obtained.

Figure 4:
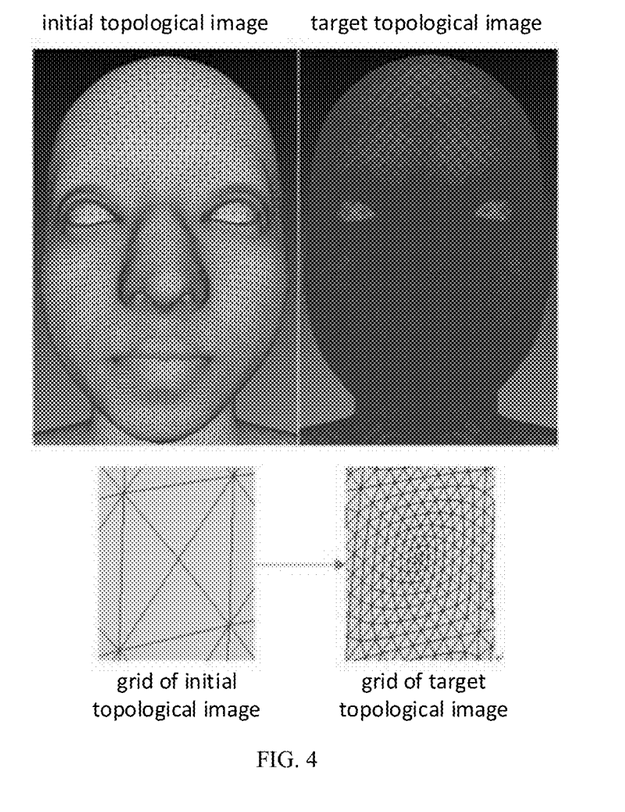
FIG. 4 is a schematic diagram of grid subdivision processing according to an embodiment of the disclosure.

The grid subdivision processing is to increase the number of vertices and triangular patches of a grid of an image according to certain processing rules, such that the grid density is increased. For example, as illustrated in FIG. 4 which is a schematic diagram of grid subdivision processing according to an embodiment of the disclosure, through the grid subdivision processing performed on the initial topological image to obtain the target topological image, the grid density of the target topological image is increased compared to the initial grid density of initial topological image, such that the initial point cloud data density of the initial topological image is increased and the target point cloud data density of the obtained target topological image is higher than the initial point cloud data intensity.

In S205, non-rigid deformation processing is performed on the initial morphable model based on the plurality of target topological images to obtain a plurality of morphable models as the plurality of models to be synthesized.

After the target topological images are obtained by performing the grid subdivision processing on the initial topological images, the non-rigid deformation processing can be performed on the initial morphable model based on the target topological images to obtain the morphable models. The obtained morphable models are used as the models to be synthesized.

The non-rigid deformation processing is an image transformation method, such as image scaling transformation, image projection transformation, and image affine transformation, which is not limited in the disclosure.

In practical application, the topology structure of the target topological image may be inconsistent with the topology structure of the initial morphable model, and thus it is impossible to directly perform migration and deformation. At this time, the target topological image will be taken as a reference to perform the non-rigid deformation processing on the initial morphable model, to make the topology structure of the target topological image is the same as the topology structure of the initial morphable model. In this way, the alignment effect of the target topological images and the initial morphable model can be effectively guaranteed, and the obtained models to be synthesized can be more consistent with the target topological images.

Figure 5:
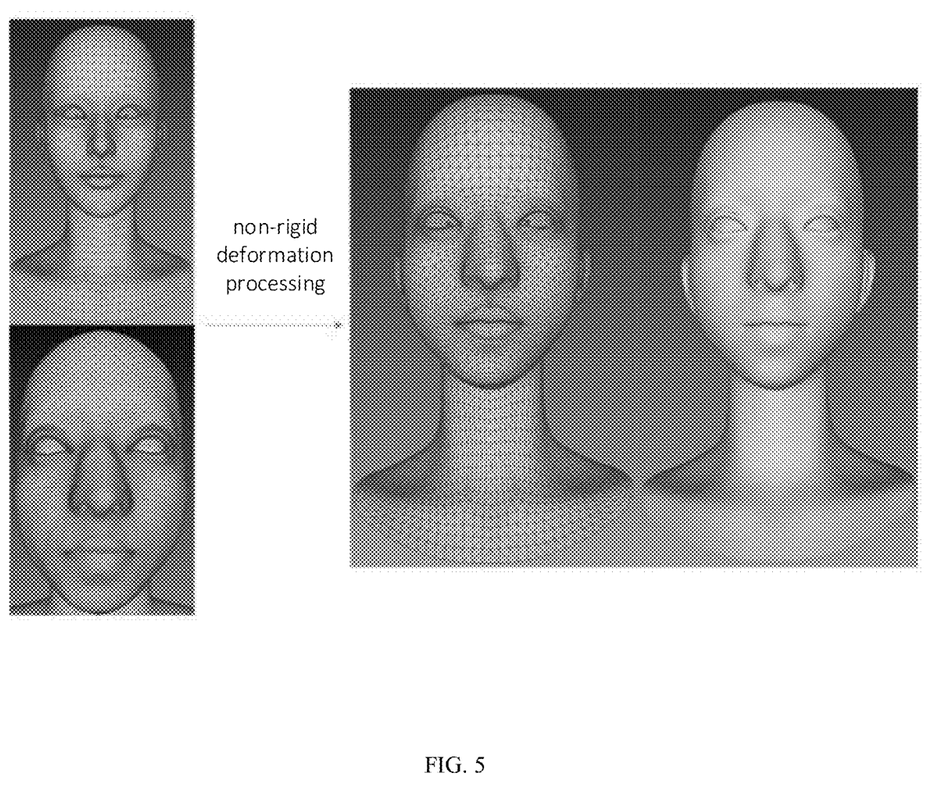
FIG. 5 is a schematic diagram of non-rigid deformation processing according to an embodiment of the disclosure.

For example, this block will be described in detail in combination with FIG. 5 which is a schematic diagram of non-rigid deformation processing according to the embodiment of the disclosure. As illustrated in FIG. 5, an affine transformation matrix is obtained for each vertex of triangular patches that constitute the topological structure of the initial morphable model by taking the target topological image as a reference. Through the affine transformation matrix, the non-rigid deformation processing of the initial morphable model is performed, to obtain the morphable model. The morphable model is used as a model to be synthesized.

In embodiments of the disclosure, the initial morphable model is obtained, the initial images of the object and the depth images corresponding to the initial images are obtained from different photographing angles. Therefore, since the initial images of the object and the depth images are acquired from different photographing angles, the cost of image capturing can be effectively reduced, while the convenience of image capturing can be effectively improved. In addition, the initial images captured from different photographing angles can fully represent the morphology of the object (e.g., the texture, the structure and the shape of the object), such that the accuracy of the generated object model can be improved. After obtaining the initial topological images by processing the initial images based on the depth images, the grid subdivision processing can be performed on the initial topological images to obtain the target topological images. In this way, in the subsequent object model generation process, the image alignment effect can be effectively guaranteed, and the accuracy and reliability of the subsequent object model generation results can be greatly improved. Further, the non-rigid deformation processing is performed on the initial morphable model based on the target topological images to obtain the morphable models, and the morphable models are determined as the models to be synthesized. In this way, the alignment effect of the target topological images and the initial morphable model can be effectively guaranteed, and the obtained models to be synthesized can be more consistent with the target topological images, thereby effectively ensuring the generation effect of the object model.

Figure 6:
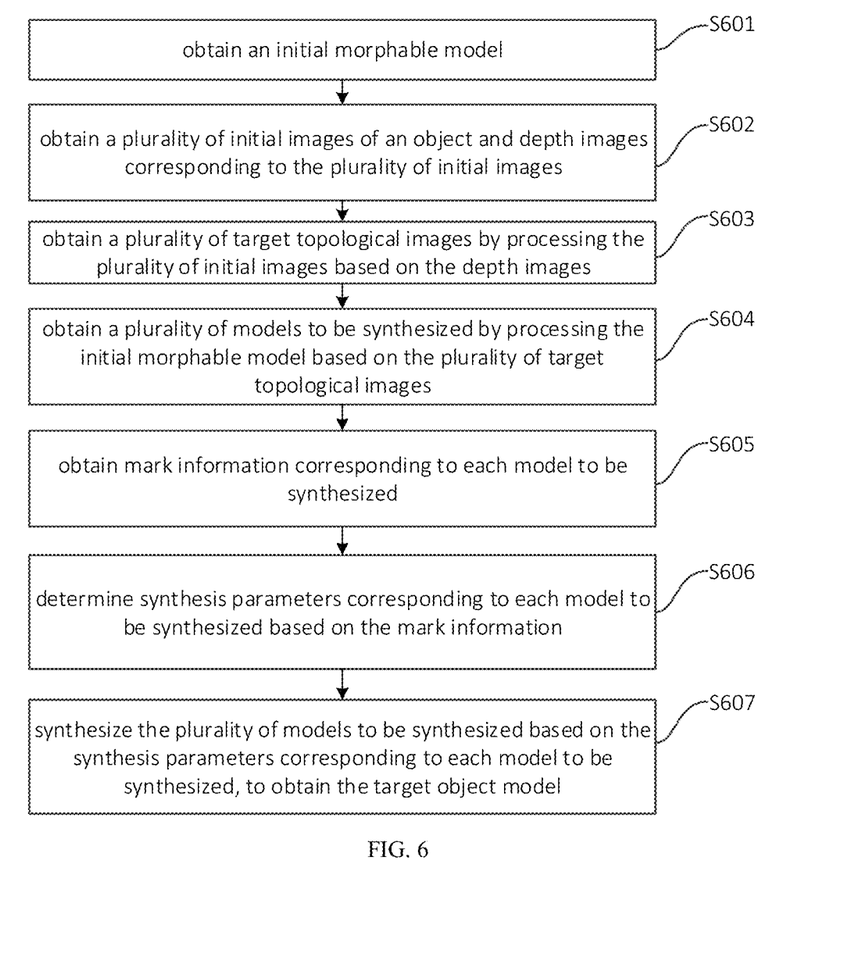
FIG. 6 is a schematic diagram of a third embodiment of the disclosure.

FIG. 6 is a schematic diagram of a third embodiment of the disclosure.

As illustrated in FIG. 6, the method for generating an object model includes the following.

In S601, an initial morphable model is obtained.

In S602, a plurality of initial images of an object and depth images corresponding to the plurality of initial images are obtained.

In S603, a plurality of target topological images are obtained by processing the plurality of initial images based on the depth images.

In S604, a plurality of models to be synthesized are obtained by processing the initial morphable model based on the plurality of target topological images.

Details of the block S601 are the same as those of blocks S101 and S201. Details of the block S602 are the same as those of blocks S102 and S202. Details of the block S603 are the same as those of blocks S103 and S203-S204. Details of the block S604 are the same as those of blocks S104 and S205.

In S605, mark information corresponding to each model to be synthesized are obtained.

After processing the initial morphable models based on the target topological images to obtain the models to be synthesized, the mark information corresponding to each of the models to be synthesized can be determined.

Reference points used for synthesizing the models to be synthesized are referred to as marks. The marks can be, for example, vertices of the triangular patches that are not deformed in the above non-rigid deformation processing process. Alternatively, the marks can be reference points that are manually labeled to synthesize the models to be synthesized, which is not limited in the disclosure.

Correspondingly, each mark have associated information. This associated information can be called the mark information. The mark information may be, for example, position information of the mark, distance information between marks, or the like.

In embodiments of the disclosure, determining the mark information corresponding to each model to be synthesized includes determining marks at a boundary (such as the neck) between the 3D head model and the 3D human body model, and determining the mask information of the marks corresponding to each model to be synthesized based on the determined marks.

In S606, synthesis parameters corresponding to each model to be synthesized are determined based on the mark information.

The synthesis parameters are used to synthesize the models to be synthesized. The synthesis parameters can be, for example, scale, rigidity, displacement matrix of the 3D head model and the 3D human body model, which are not limited in the disclosure.

In some embodiments, obtaining the synthesis parameters corresponding to each model to be synthesized based on the mark information includes determining scale information, rigidity information, and displacement matrix corresponding to each model to be synthesized based on the mark information, and determining the scale information, the rigidity information, and the displacement matrix as the synthesis parameters. In this way, the diversity of the synthesis parameters can be effectively improved, and the accuracy of the synthesis parameters can be effectively guaranteed, so that the generation effect of the object model can be effectively improved based on the synthesis parameters.

In some embodiments, the synthesis parameters corresponding to each model to be synthesized can be determined based on the mark information by means of mathematical operation, or according to any other possible manner, which is not limited in the disclosure.

In S607, the target object model is obtained by synthesizing the models to be synthesized based on the synthesis parameters corresponding to each model to be synthesized.

After determining the synthesis parameters corresponding to each model to be synthesized according to the mark information, the plurality of models to be synthesized can be synthesized according to the synthesis parameters of each model to be synthesized, to obtain the target object model.

Figure 7:
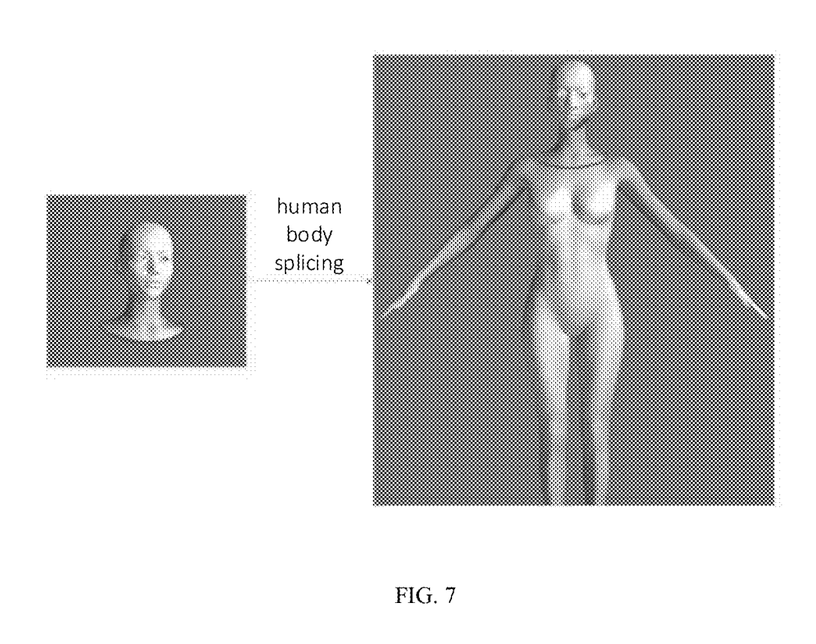
FIG. 7 is a schematic diagram of model synthesis processing according to an embodiment of the disclosure.

In some embodiments, as illustrated in FIG. 7 which is a schematic diagram of model synthesis processing according to an embodiment of the disclosure, synthesizing the models to be synthesized based on the synthesis parameters includes determining mark pairs, in which the mark pair includes a mark from the 3D head model and a mark from the 3D human body model, and there is a certain correspondence between the mark from the 3D head model and the mark from the 3D human body model, based on the synthesis parameters, and synthesizing the 3D head model and the 3D body model based on the mark pairs to obtain the target object model. Alternatively, a rigid transformation matrix can be generated according to the synthesis parameters, and the models to be synthesized can be synthesized based on the rigid transformation matrix, to obtain the target object model, which is not limited in the disclosure.

Therefore, in embodiments of the disclosure, the mark information corresponding to each model to be synthesized is determined, the synthesis parameters corresponding to each model to be synthesized is determined based on the mark information, and the models to be synthesized are synthesized into the target object model based on the synthesis parameters corresponding to each model to be synthesized. Since the models to be synthesized are synthesized according to the mark information corresponding to each model to be synthesized, the synthesizing processing is objective and accurate with reference to the mark information, thereby effectively avoiding introducing subjective synthesis interference factors, and ensuring the synthesis effect of the models.

In some embodiments, the initial morphable model is obtained, the initial images of an object and the depth images corresponding to the initial images are obtained, the target topological images are obtained by processing the initial images based on the depth images, the models to be synthesized are obtained by processing the initial morphable model based on the target topological images, the mark information corresponding to each model to be synthesized is determined, the synthesis parameters corresponding to each model to be synthesized are determined based on the mark information, and the models to be synthesized are synthesized based on the synthesis parameters corresponding to each model to be synthesized to obtain the target object model. Since the models to be synthesized are synthesized according to the mark information corresponding to each model to be synthesized, the synthesizing processing is objective and accurate with reference to the mark information, thereby effectively avoiding introducing subjective synthesis interference factors, and ensuring the synthesis effect of the models.

Figure 8:
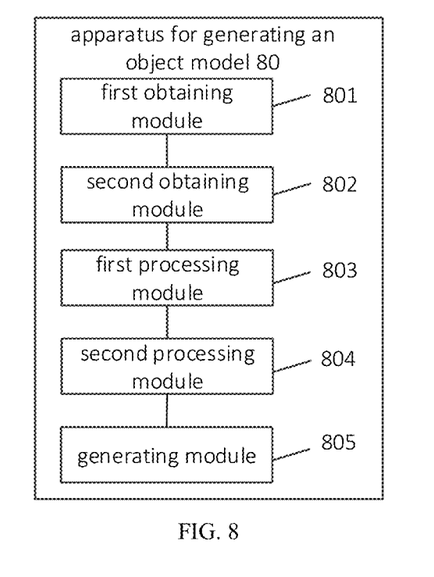
FIG. 8 is a schematic diagram of a fourth embodiment of the disclosure.

FIG. 8 is a schematic diagram of a fourth embodiment according to the disclosure.

As illustrated in FIG. 8, an apparatus for generating an object model 80 includes: a first obtaining module 801, a second obtaining module 802, a first processing module 803, a second processing module 804 and a generating module 805.

The first obtaining module 801 is configured to obtain an initial morphable model.

The second obtaining module 802 is configured to obtain a plurality of initial images of an object and depth images corresponding to the plurality of initial images.

The first processing module 803 is configured to obtain a plurality of target topological images by processing the plurality of initial images based on the depth images.

The second processing module 804 is configured to obtain a plurality of models to be synthesized by processing the initial morphable model based on the plurality of target topological images.

The generating module 805 is configured to generate a target object model based on the plurality of models to be synthesized.

Figure 9:
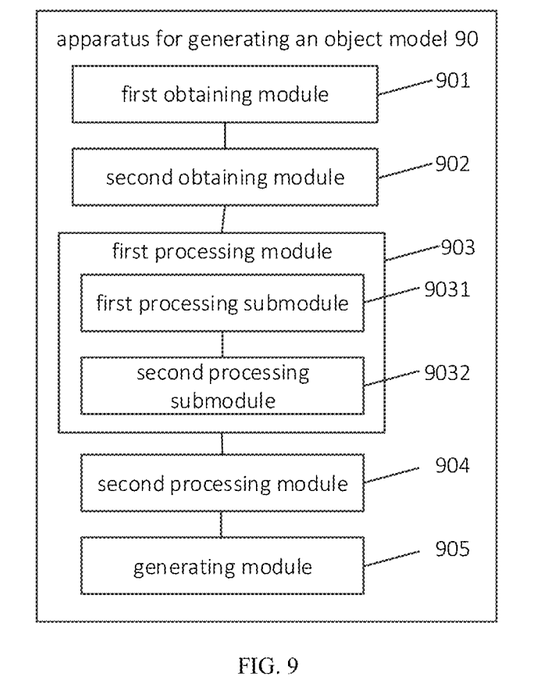
FIG. 9 is a schematic diagram of a fifth embodiment of the disclosure.

FIG. 9 is a schematic diagram of a fifth embodiment according to the disclosure. As illustrated in FIG. 9, an apparatus for generating an object model 90 includes: a first obtaining module 901, a second obtaining module 902, a first processing module 903, a second processing module 904 and a generating module 905.

The first processing module 903 includes: a first processing submodule 9031 and a second processing submodule 9032.

The first processing submodule 9031 is configured to obtain a plurality of initial topological images by processing the plurality of initial images based on the depth images. Each initial topological image has an initial point cloud data density.

The second processing submodule 9032 is configured to obtain the plurality of target topological images by performing grid subdivision processing on the plurality of initial topological images. Each target topological images has a target point cloud data density. The target point cloud data density is greater than the initial point cloud data density.

In some embodiments, the second processing module 904 is further configured to perform non-rigid deformation processing on the initial morphable model based on the plurality of target topological images to obtain a plurality of morphable models, and determine the plurality of morphable models as the plurality of models to be synthesized.

In some embodiments, the first processing submodule 9031 is further configured to perform differentiable rendering processing on the plurality of initial images based on the depth images, to obtain the plurality of initial topological images.

In some embodiments, the generating module 905 is further configured to obtain mark information corresponding to each model to be synthesized; determine synthesis parameters corresponding to each model to be synthesized based on the mark information; and synthesize the plurality of models to be synthesized based on the synthesis parameters corresponding to each model to be synthesized, to obtain the target object model.

In some embodiments, the plurality of initial images are captured from different photographing angles, and the second obtaining module 902 is further configured to obtain the plurality of initial images of the object based on the photographing angles.

In some embodiments, the generating module 905 is further configured to obtain scale information, rigidity information and displacement matrix corresponding to each model to be synthesized based on the mark information, and determine the scale information, the rigidity information and the displacement matrix as the synthesis parameters.

It is understandable that the apparatus for generating an object model 90 of FIG. 9 can have the same functions and structure as the apparatus for generating an object model 80, for example, the first obtaining module 901 and the first obtaining module 801, the second obtaining module 902 and the second obtaining module 802, the first processing module 903 and the first processing module 803, the second processing module 904 and the second processing module 804, the generating module 905 and the generating module 805 may have the same function and structure.

It is to be noted that the foregoing explanation of the method for generating an object model is also applicable to the apparatus for generating an object model of this embodiment.

In this embodiment, the initial morphable model is obtained, the initial images of an object and the depth images corresponding to the initial images are obtained, the target topological images are obtained by processing the initial images based on the depth images, the models to be synthesized are obtained by processing the initial morphable model based on the target topological images, and the target object model is generated based on the plurality of models to be synthesized. In this way, the costs of generating the object model can be greatly reduced, and the generation effect of the object model can be effectively improved at the same time, so that the applicability of the method for generating an object model can be significantly improved.

According to the embodiments of the disclosure, the disclosure also provides an electronic device, a readable storage medium and a computer program product.

Figure 10:
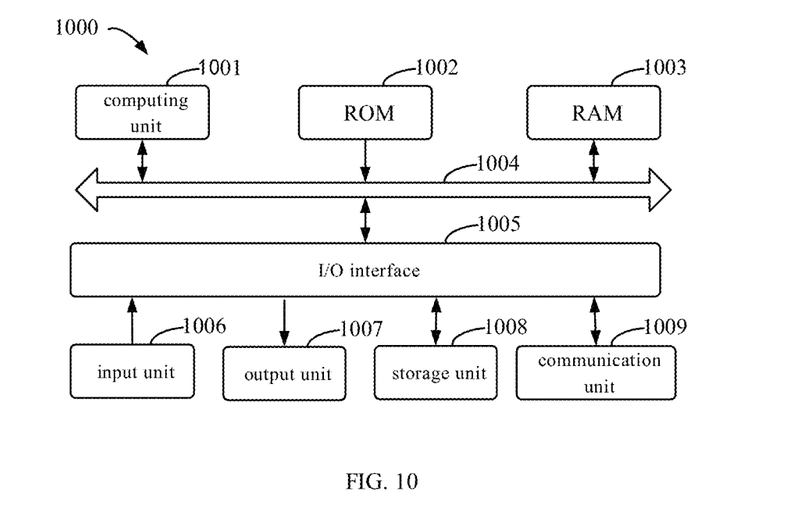
FIG. 10 is a block diagram of an example electronic device that can be used to implement the method for generating an object model according to an embodiment of the disclosure.

FIG. 10 is a block diagram of an example electronic device 1000 used to implement the method for generating an object model according to the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 10, the device 1000 includes a computing unit 1001 performing various appropriate actions and processes based on computer programs stored in a read-only memory (ROM) 1002 or computer programs loaded from the storage unit 1008 to a random access memory (RAM) 1003. In the RAM 1003, various programs and data required for the operation of the device 1000 are stored. The computing unit 1001, the ROM 1002, and the RAM 1003 are connected to each other through a bus 1004. An input/output (I/O) interface 1005 is also connected to the bus 1004.

Components in the device 1000 are connected to the I/O interface 1005, including: an inputting unit 1006, such as a keyboard, a mouse; an outputting unit 1007, such as various types of displays, speakers; a storage unit 1008, such as a disk, an optical disk; and a communication unit 1009, such as network cards, modems, and wireless communication transceivers. The communication unit 1009 allows the device 1000 to exchange information/data with other devices through a computer network such as the Internet and/or various telecommunication networks.

The computing unit 1001 may be various general-purpose and/or dedicated processing components with processing and computing capabilities. Some examples of computing unit 1001 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 1001 executes the various methods and processes described above, such as the method for generating an object model. For example, in some embodiments, the method may be implemented as a computer software program, which is tangibly contained in a machine-readable medium, such as the storage unit 1008. In some embodiments, part or all of the computer program may be loaded and/or installed on the device 1000 via the ROM 1002 and/or the communication unit 1009. When the computer program is loaded on the RAM 1003 and executed by the computing unit 1001, one or more steps of the method described above may be executed. Alternatively, in other embodiments, the computing unit 1001 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in a cloud computing service system, in order to solve the existing defects of difficult management and weak business expansion in traditional physical hosting and virtual private server (VPS) services. The server can also be a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for generating an object model, comprising:
   obtaining an initial morphable model;
   obtaining a plurality of initial images of an object, and depth images corresponding to the plurality of initial images;
   obtaining a plurality of target topological images by processing the plurality of initial images based on the depth images;
   obtaining a plurality of models to be synthesized by processing the initial morphable model based on the plurality of target topological images; and
   generating a target object model based on the plurality of models to be synthesized,
   wherein obtaining the plurality of target topological images by processing the plurality of initial images based on the depth images comprises:
   obtaining a plurality of initial topological images by processing the plurality of initial images based on the depth images, wherein each initial topological image has an initial point cloud data density; and
   obtaining the plurality of target topological images by performing grid subdivision processing on the plurality of initial topological images, wherein each target topological image has a target point cloud data density, and the target point cloud data density is greater than the initial point cloud data density.

2. The method of claim 1, wherein obtaining the plurality of models to be synthesized by processing the initial morphable model based on the plurality of target topological images comprises:
   performing non-rigid deformation processing on the initial morphable model based on the plurality of target topological images to obtain a plurality of morphable models, and determining the plurality of morphable models as the plurality of models to be synthesized.

3. The method of claim 1, wherein obtaining the plurality of initial topological images by processing the plurality of initial images based on the depth images comprises:
   performing differentiable rendering processing on the plurality of initial images based on the depth images, to obtain the plurality of initial topological images.

4. The method of claim 1, wherein generating the target object model based on the plurality of models to be synthesized comprises:
   obtaining mark information corresponding to each model to be synthesized;
   determining synthesis parameters corresponding to each model to be synthesized based on the mark information; and
   synthesizing the plurality of models to be synthesized based on the synthesis parameters corresponding to each model to be synthesized, to obtain the target object model.

5. The method of claim 1, wherein obtaining the plurality of initial images of the object comprises:
   obtaining the plurality of initial images by photographing the object from different photographing angles.

6. The method of claim 4, wherein determining the synthesis parameters corresponding to each model to be synthesized based on the mark information comprises:
   obtaining scale information, rigidity information and displacement matrix corresponding to each model to be synthesized based on the mark information, and determining the scale information, the rigidity information and the displacement matrix as the synthesis parameters.

7. An electronic device, comprising:
   at least one processor; and
   a memory communicatively coupled to the at least one processor; wherein,
   the memory stores instructions executable by the at least one processor, when the instructions are executed by the at least one processor, the at least one processor is configured to:
   obtain an initial morphable model;
   obtain a plurality of initial images of an object and depth images corresponding to the plurality of initial images;
   obtain a plurality of target topological images by processing the plurality of initial images based on the depth images;
   obtain a plurality of models to be synthesized by processing the initial morphable model based on the plurality of target topological images; and
   generate a target object model based on the plurality of models to be synthesized,
   wherein the at least one processor is configured to:
   obtain a plurality of initial topological images by processing the plurality of initial images based on the depth images, wherein each initial topological image has an initial point cloud data density; and
   obtain the plurality of target topological images by performing grid subdivision processing on the plurality of initial topological images, wherein each target topological image has a target point cloud data density, and the target point cloud data density is greater than the initial point cloud data density.

8. The electronic device of claim 7, wherein the at least one processor is configured to:
   perform non-rigid deformation processing on the initial morphable model based on the plurality of target topological images to obtain a plurality of morphable models, and determine the plurality of morphable models as the plurality of models to be synthesized.

9. The electronic device of claim 7, wherein the at least one processor is configured to:
   perform differentiable rendering processing on the plurality of initial images based on the depth images, to obtain the plurality of initial topological images.

10. The electronic device of claim 7, wherein the at least one processor is configured to:
    obtain mark information corresponding to each model to be synthesized;
    determine synthesis parameters corresponding to each model to be synthesized based on the mark information; and
    synthesize the plurality of models to be synthesized based on the synthesis parameters corresponding to each model to be synthesized, to obtain the target object model.

11. The electronic device of claim 7, wherein the at least one processor is configured to:
    obtain the plurality of initial images by photographing the object from different photographing angles.

12. The electronic device of claim 10, wherein the at least one processor is configured to:
    obtain scale information, rigidity information and displacement matrix corresponding to each model to be synthesized based on the mark information, and determine the scale information, the rigidity information and the displacement matrix as the synthesis parameters.

13. A non-transitory computer-readable storage medium storing computer instructions, wherein the computer instructions are configured to cause a computer to implement a method for generating an object model, the method comprising:
    obtaining an initial morphable model;
    obtaining a plurality of initial images of an object, and depth images corresponding to the plurality of initial images;
    obtaining a plurality of target topological images by processing the plurality of initial images based on the depth images;
    obtaining a plurality of models to be synthesized by processing the initial morphable model based on the plurality of target topological images; and
    generating a target object model based on the plurality of models to be synthesized,
    wherein obtaining the plurality of target topological images by processing the plurality of initial images based on the depth images comprises:
    obtaining a plurality of initial topological images by processing the plurality of initial images based on the depth images, wherein each initial topological image has an initial point cloud data density; and
    obtaining the plurality of target topological images by performing grid subdivision processing on the plurality of initial topological images, wherein each target topological image has a target point cloud data density, and the target point cloud data density is greater than the initial point cloud data density.

14. The non-transitory computer-readable storage medium of claim 13, wherein obtaining the plurality of models to be synthesized by processing the initial morphable model based on the plurality of target topological images comprises:
    performing non-rigid deformation processing on the initial morphable model based on the plurality of target topological images to obtain a plurality of morphable models, and determining the plurality of morphable models as the plurality of models to be synthesized.

15. The non-transitory computer-readable storage medium of claim 13, wherein obtaining the plurality of initial topological images by processing the plurality of initial images based on the depth images comprises:
    performing differentiable rendering processing on the plurality of initial images based on the depth images, to obtain the plurality of initial topological images.

16. The non-transitory computer-readable storage medium of claim 13, wherein generating the target object model based on the plurality of models to be synthesized comprises:
    obtaining mark information corresponding to each model to be synthesized;
    determining synthesis parameters corresponding to each model to be synthesized based on the mark information; and
    synthesizing the plurality of models to be synthesized based on the synthesis parameters corresponding to each model to be synthesized, to obtain the target object model.

17. The non-transitory computer-readable storage medium of claim 13, wherein obtaining the plurality of initial images of the object comprises:
    obtaining the plurality of initial images by photographing the object from different photographing angles.

* * * * *